United States Patent
He et al.

(10) Patent No.: US 6,959,129 B2
(45) Date of Patent: Oct. 25, 2005

(54) BIDIRECTIONAL MULTIPLEXER AND DEMULTIPLEXER BASED ON A SINGLE ECHELLE WAVEGUIDE GRATING

(75) Inventors: Jian-Jun He, Ottawa (CA); Orazio Berolo, Ottawa (CA); Michael Davies, Ottawa (CA)

(73) Assignee: MetroPhotonics Inc., Ottawa (CA)

( * ) Notice: Subject to any disclaimer, the term of this patent is extended or adjusted under 35 U.S.C. 154(b) by 350 days.

(21) Appl. No.: 09/799,013

(22) Filed: Mar. 6, 2001

(65) Prior Publication Data

US 2002/0081061 A1 Jun. 27, 2002

Related U.S. Application Data

(60) Provisional application No. 60/257,095, filed on Dec. 22, 2000.

(51) Int. Cl.[7] .................................................. G02B 6/28
(52) U.S. Cl. .............................. 385/24; 385/14; 385/37
(58) Field of Search .............................. 385/10, 14, 15, 385/24, 31, 46, 37, 129, 39, 42–43; 359/130, 131, 124, 127

(56) References Cited

U.S. PATENT DOCUMENTS

| | | |
|---|---|---|
| 5,228,103 A | 7/1993 | Chen et al. |
| 5,414,548 A | 5/1995 | Tachikawa et al. |
| 5,799,118 A * | 8/1998 | Ogusu et al. ................. 385/14 |
| 5,917,625 A | 6/1999 | Ogusu et al. |
| 5,933,270 A | 8/1999 | Toyohara |
| 5,937,113 A | 8/1999 | He et al. |
| 6,072,612 A | 6/2000 | Liou et al. |
| 6,108,471 A | 8/2000 | Zhang et al. |
| 6,421,481 B1 * | 7/2002 | Sappey ........................ 385/37 |

FOREIGN PATENT DOCUMENTS

| | | |
|---|---|---|
| EP | 0 250 824 | 1/1988 |
| EP | 0 911 659 | 4/1999 |
| GB | 2 219 869 | 12/1989 |

OTHER PUBLICATIONS

Herben et al., "A Compact Integrated InP–Based Single–Phasar Optical Crossconnect", *IEEE Photonics Technology Letters*, May 1998, vol. 10, No. 5, pp. 678–680.

Reinhard Märx, "Integrated Optics: Design and Modeling", Artech House, chapter 8.2, pp. 268–277, 1994.

* cited by examiner

*Primary Examiner*—Frank G. Font
*Assistant Examiner*—Michael P. Mooney
(74) *Attorney, Agent, or Firm*—Freedman & Associates

(57) ABSTRACT

A bidirectional multiplexer and demultiplexer based on a single waveguide grating is presented. In one embodiment of the invention, the device contains a multi/demultiplexer having an echelle grating disposed between a plurality of input channels and a plurality of output channel arrays. The input and output channels are assigned in a particular order, such that the multiplex and demultiplex functions have the same wavelength channels and such that the blaze angle of the grating facets are optimized simultaneously for both the multiplex and demultiplex function. Because the optical signals are multiplexed and demultiplexed by the same dispersive element, problems of mismatching performance introduced by using different optical components are obviated. The input/output waveguides of the dual-function device can be coupled to a single fiber array, thus reducing the packaging cost.

40 Claims, 10 Drawing Sheets

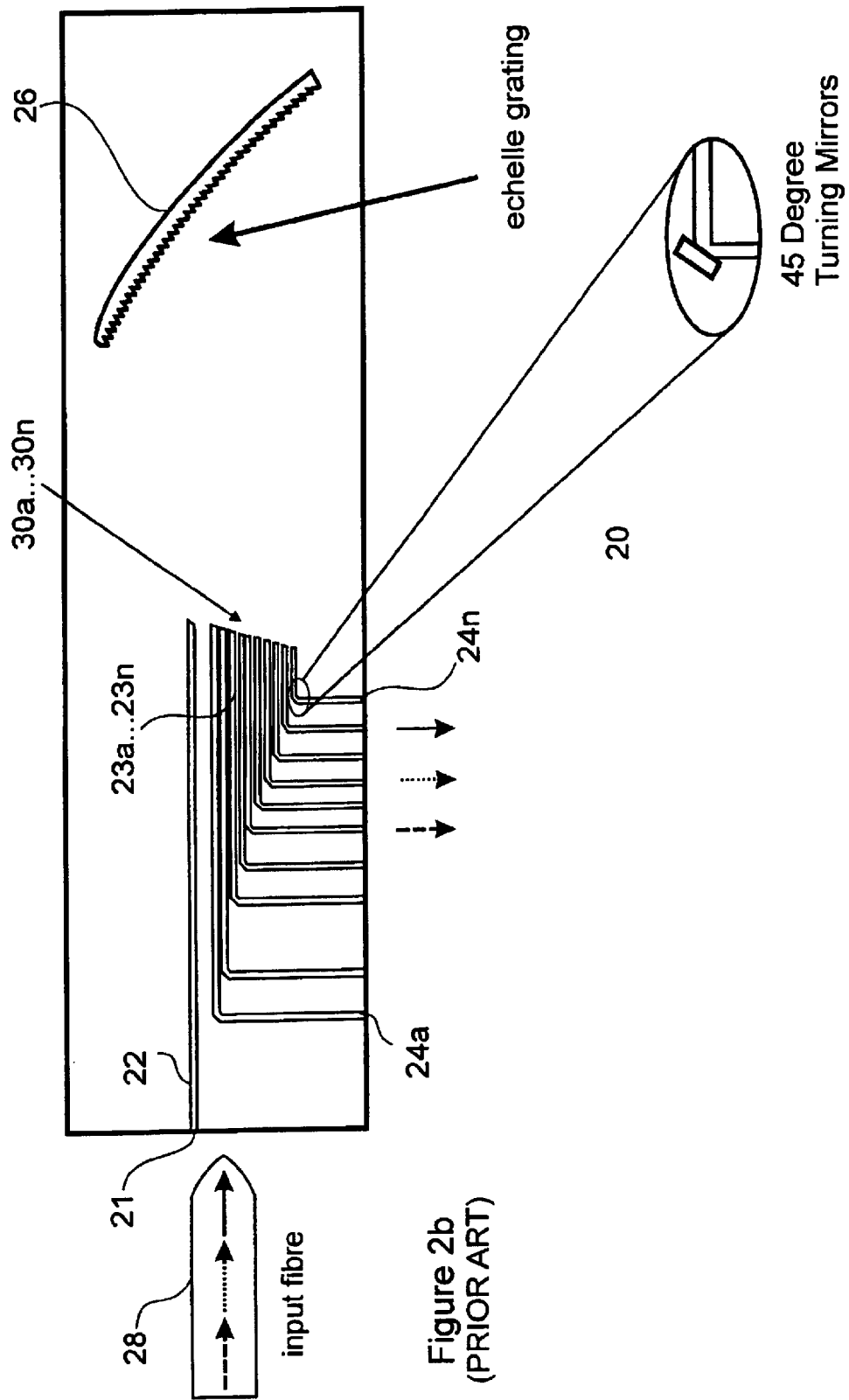

BIDIRECTIONAL MULTIPLEXER AND DEMULTIPLEXER BASED ON A SINGLE ECHELLE WAVEGUIDE GRATING

This file claims the benefit of Provisional Application No. 60/257,095, filed Dec. 22, 2000.

FIELD OF THE INVENTION

The invention relates generally to optical communications and in particular to integrated optic grating multi/demultiplexers.

DESCRIPTION OF THE PRIOR ART

The information that is transmitted over most optical communications networks is typically encoded within a plurality of different wavelength channels that are multiplexed together into a signal for transmission over an optical fiber. Thus, in order to extract useful information it is necessary to demultiplex the multiplexed optical signal by separating the multiplexed signal into its component wavelength channels. Often, at least some component wavelength channels are dropped from the optical signal. Alternatively, the signals that are carried over certain wavelength channels are modified, detected or otherwise processed, for instance at a node on an optical network. Finally, a new multiplexed signal is constructed for further transmission over the optical communications network.

FIG. 1(a) shows an example of a multi-wavelength transceiver module containing a wavelength multiplexer and demultiplexer. An example of an optical network node using the multi-wavelength transceiver is shown in FIG. 1(b). An incoming fiber contains n (e.g. n=32) optical signal channels of different wavelengths. A subset of the signal channels (e.g. m=4 channels) are dropped at the node by using a band pass filter. These channels are separated at the node using an optical demultiplexer and are then converted into electrical signals. At the same time, the same number of signals generated at the node can be transmitted at the same wavelengths as those of the dropped channels and combined into a single mode fiber using an optical multiplexer which can be identical to the demultiplexer but operated in the reversed direction. The multiplexed signal can then be added to the output fiber using another band pass filter, together with the pass-through channels.

As is in the above example, for most network applications, each node requires a multiplexer and a demultiplexer, for combining and separating the component wavelength channels of a multiplexed optical signal. They are important components in a Dense Wavelength Division Multiplexing (DWDM) optical communications network. Different DWDM technologies are known, including: thin film filters, fiber Bragg gratings, phased arrayed waveguide gratings (AWG) and etched echelle grating-on-a-chip spectrometers. The integrated devices have many advantages such as compactness, reliability, reduced fabrication and packaging costs, and potential monolithic integration with active devices of different functionalities. However, it is generally recognized at present that thin film filters and fiber Bragg grating based demultiplexers are more suitable for low channel count devices, while AWG and echelle grating based waveguide demultiplexers are better suited for large channel count devices.

For many network applications, especially for metropolitan networks, it is desirable that the system be scalable, for instance a small number of channels are added/dropped at a node initially but that number may be increased at a later time together with the total number of channels in the system, as demand on the network increases. Thus integrated devices such as AWG and echelle grating are less favorable for such applications due to the small channel count that they require.

The demultiplexer and multiplexer used in the above example network node can be realized by using two AWG or echelle grating based devices with matching channel wavelengths. Unfortunately, using two different devices for each of the individual steps of demultiplexing and of multiplexing optical signals are prone to errors associated with the mismatched channel wavelengths. A paired device must be selected very carefully from a production lot, and their operating conditions must be individually tuned to achieve a good matching. The production yield has been typically very low. Furthermore, the industry trend is in a direction of using an increasingly small channel spacing, in order to accommodate more wavelength channels in the systems. Such dense WDM communications systems have much lower device mismatching error tolerance due to the decrease in channel spacing. It will be apparent to one of skill in the art that the difficulty and expense of manufacturing identically-matched devices increases dramatically as the channel spacing decreases.

U.S. Pat. No. 5,414,548, issued to Tachikawa et al. in 1995, describes an arrayed waveguide grating multi/demultiplexer with loop back optical paths. A same arrayed waveguide grating is used twice in the optical path of the signals, the first time as a demultiplexer for separating a multiplexed input signal, and the second time as a multiplexer for combining the same wavelength channels into a multiplexed signal for outputting to a fiber transmission line. Optical switches or other signal processing means are used in the loopback paths to realize functionalities such as optical add-drop. A similar concept with a slightly different configuration is reported in a paper entitled "A compact integrated InP-based single-phasar optical crossconnect" by C. G. P. Herben et al., IEEE Photonics Tech. Lett. 10, pp. 678–680, 1998. In principle, these devices can also be used as a dual-function multiplexer/demultiplexer in a multi-wavelength transceiver. A drawback of these devices for such applications is that two fiber arrays are required to couple to the input/output ports on both sides of the AWG.

U.S. Pat. No. 5,933,270, issued to Toyohara in 1999, describes an optical equalizer in which a WDM coupler is passed twice, the first time as a demultiplexer and the second time as a multiplexer. The channelized signals after the first pass are reflected back to the same port by a light-reflecting means and the multiplexed signal after the second pass is output to the same port as the multiplexed input signal. This device is not suitable for multiwavelength transceiver application because each port is used twice for input and output and therefore a circulator is required at each port to separate the output from the input.

It would be advantageous to provide a waveguide grating based apparatus for performing the functionalities of both multiplexing and demultiplexing simultaneously in a multiwavelength transceiver using a same dispersive element. Such a device reduces the number of devices required while increasing the number of channels on the single grating device, thus making the waveguide grating based technology more efficient and economically more competitive, even for the small channel count market. Moreover, since the multiplexing and demultiplexing are performed by the same grating device, the channel wavelengths are automatically matched.

It would be further advantageous to provide an echelle grating based device that performs both multiplexing and demultiplexing simultaneously. In addition to the advantages inherently associated with echelle gratings, the input and output ports of the dual-function device can be coupled to a single fiber array on one side of the chip, thus reducing the packaging costs.

OBJECT OF THE INVENTION

It is an object of the invention to provide a waveguide grating based apparatus for performing the functionalities of both multiplexing and demultiplexing simultaneously in a multi-wavelength transceiver. In particular, it is an object of the invention to provide an echelle grating based dual multiplexer-demultiplexer of which the input and output ports are appropriately arranged so that the blazing angles of the grating facets are optimized simultaneously for the multiplexer and demultiplexer ports.

SUMMARY OF THE INVENTION

In accordance with the invention there is provided an optical wavelength division multiplexer/demultiplexer device comprising:

an input port for coupling a first multiplexed optical signal containing a first plurality of wavelength channels from an optical fiber to an input waveguide;

a plurality of output ports, each for coupling a channelized signal of said first plurality of wavelength channels from a single corresponding waveguide to an optical fiber;

a plurality of input ports, each for coupling a channelized wavelength signal of a second plurality of wavelength channels from an optical fiber to a single corresponding waveguide;

an output port for coupling a second multiplexed optical signal containing said second plurality of wavelength channels from an output waveguide to an optical fiber; and, an echelle grating element disposed for separating the first multiplexed optical signal received from the input waveguide into signals within individual wavelength channels and for directing each into a corresponding output waveguide and for combining a second plurality of signals within corresponding wavelength channels received from the input waveguides into a second multiplexed optical signal and for providing the second multiplexed optical signal to the output waveguide.

In accordance with the invention there is provided an optical wavelength division multiplexer/demultiplexer device comprising:

a first port through which a first signal having optical signals within at least two predetermined wavelength channels can propagate;

a plurality of third ports associated with the first port, through each of which an optical signal within one predetermined wavelength channel of the first signal can propagate;

a second port through which a second signal having optical signals within at least two predetermined wavelength channels can propagate;

a plurality of fourth ports associated with the second port, through each of which an optical signal within one predetermined wavelength channel of the second signal can propagate; and, a same echelle grating optically disposed between the first port and the plurality of third ports and between the second port and the plurality of fourth ports, wherein signals provided at each of the first and second ports propagate along a forward optical path to the same echelle grating, the echelle grating for dispersing the signals in dependence upon wavelength to provide an optical signal within a separate predetermined wavelength channel to each port of the associated plurality of third ports and fourth ports, wherein at least two optical signals provided within separate predetermined wavelength channels at separate ports of the plurality of third ports propagate along at least two associated backward optical paths to the same echelle grating, the echelle grating for multiplexing the two optical signals and for providing a signal having optical signals within the at least two predetermined wavelength channels to the associated first port, and wherein at least two optical signals provided within separate predetermined wavelength channels at separate ports of the plurality of fourth ports propagate along at least two associated backward optical paths to the same echelle grating, the echelle grating for multiplexing the two optical signals and for providing a signal having optical signals within the two predetermined wavelength channels to the associated second port.

In accordance with the invention there is provided an optical wavelength division multiplexer/demultiplexer device comprising:

a first port for receiving a first signal having optical signals within at least two different predetermined wavelength channels;

a second port for outputting a second signal having optical signals within at least two different predetermined wavelength channels;

a plurality of third ports associated with the first port, each of the plurality of third ports for providing an optical signal within one different predetermined wavelength channel of the optical signal received at the first port;

a plurality of fourth ports associated with the second port, each of the plurality of fourth ports for providing an optical signal within one different predetermined wavelength channel of the optical signal output from the second port; and, a same dispersive element for dispersing light signal received from the first port in dependence upon wavelength to provide channelized optical signals to each of the third ports, and for combining light signals received from the fourth ports of different predetermined wavelengths to provide a multiplexed optical signal to the second ports.

BRIEF DESCRIPTION OF THE DRAWINGS

Exemplary embodiments of the invention, will now be described, in conjunction with the drawings, in which:

FIG. 2b is a schematic diagram of a prior art echelle diffraction grating that can be used as a multiplexer or demultiplexer;

FIG. 2c is an enlarged schematic diagram of a prior art turning mirror integrated into the substrate of a diffraction grating;

DETAILED DESCRIPTION OF THE INVENTION

While the description of the preferred embodiment of the invention disclosed herein is a specific example where a same dispersive element is provided for dispersing a first multiplexed optical signal in dependence upon wavelength into individual wavelength channels and for combining a plurality of individual wavelength channels into a multiplexed optical signal, numerous modifications of the invention to allow the input and output of any number of multiplexed signals are possible by modifications to the number of ports for receiving and outputting the multiplexed signals and by modifications to the number of other ports for receiving the individual wavelength channels, without departing substantially from the teachings of the invention as set forth below.

Of the two waveguide based technologies AWG and echelle grating, the echelle grating requires higher quality, deeply etched grating facets. The optical loss of the device depends critically on the verticality and smoothness of the grating facets. However, the size of the grating device is much smaller than the phased waveguide array and the spectral finesse is much higher due to the fact that the number of teeth in the grating is much larger than the number of waveguides in the phased array. This allows an echelle grating based device to have a larger number of channels available over its free spectral range (FSR) and consequently it can be scaled-up easily to high density operation. The crosstalk is also lower due to the fact that it is easier to reduce the phase errors in a small grating. With the recent advancement in etching technology, the echelle grating has become a promising alternative to AWG device. Thus, the preferred embodiment is described with particular reference to echelle gratings.

Figure 1A:
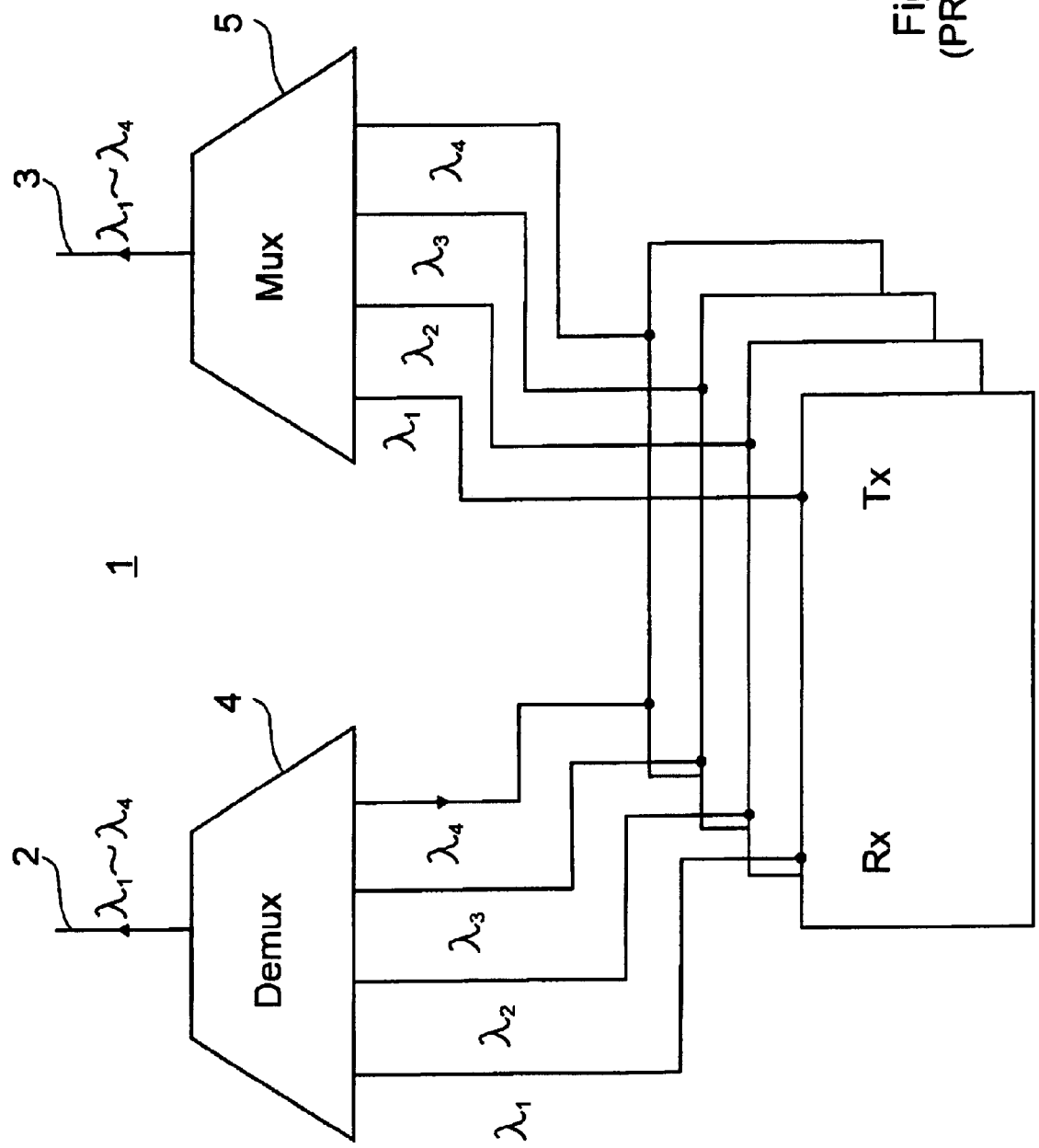
FIG. 1a is a schematic diagram of a prior art multi-wavelength transceiver module where a multiplexer is used at the transmitter for combining a plurality of wavelength channels and a demultiplexer is used at the receiver for separating a plurality of wavelength channels in dependence of wavelength.

Referring to FIG. 1a, a conventional multi-wavelength transceiver module according to the prior art is shown generally at 1. The transceiver 1 transmits and receives a plurality of wavelength channels, and comprises a demultiplexer 4, a multiplexer 5. In this specific case, four wavelengths are shown for brevity, although in general, the number of wavelengths that can be multiplexed is dependant on other hardware that is used together with the invention to produce a complete system. In the transceiver 1, the multiplexed optical signal comprising four wavelengths is separated into optical signals within four individual wavelength channels by the demultiplexer 4, and then these channelized signals are converted into electrical signals by receivers located on individual single-channel transceiver cards. Four new channels of information are converted into optical signals by the transmitters on the same transceiver cards, and are inputted into an optical multiplexer. The multiplexed optical signal is sent for transmission on the optical line 3.

Figure 1B:
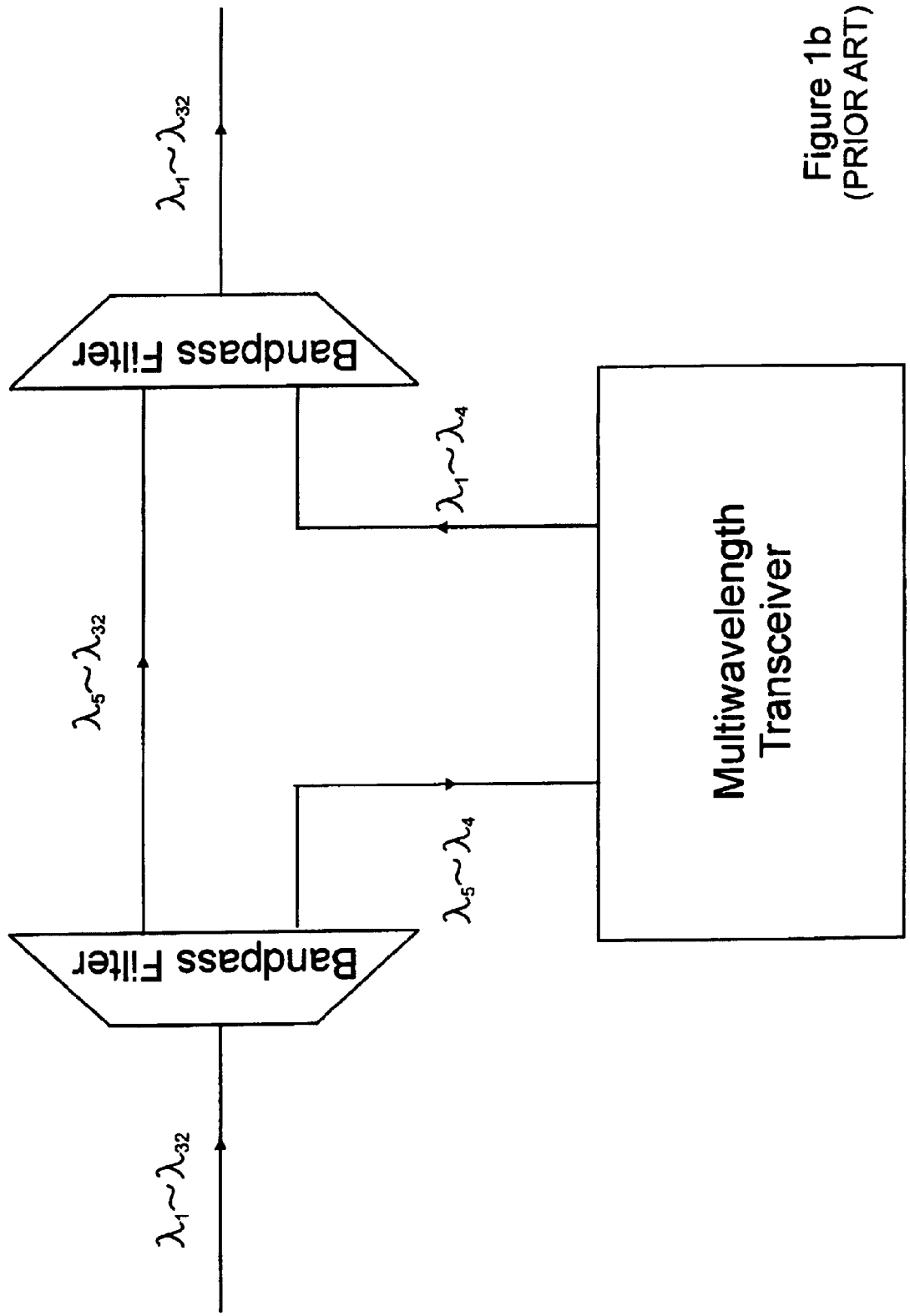
FIG. 1b is a schematic diagram of an optical band add-drop node where the multi-wavelength transceiver of FIG. 1a may be used.

FIG. 1b shows a schematic diagram of an optical band add-drop node where the above multi-wavelength transceiver may be used. An incoming fiber contains n (e.g. n=32) optical signal channels of different wavelengths. A subset of the signal channels (e.g. m=4 channels) are dropped at the node by using a band pass filter. These channels are demultiplexed and then converted into electrical signals by the multi-wavelength transceiver. Simultaneously, a same number of signals generated at the node are transmitted and multiplexed by the transceiver at the same wavelengths as those of the dropped channels. The multiplexed signal is then introduced to the output fiber using another band pass filter, together with the pass-through channels.

For the above application, the wavelengths of the add and drop channels are identical. The optical multiplexer is substantially identical to the demultiplexer operating in the reversed direction.

In the above multi-wavelength transceiver 1, both a demultiplexer 4 and a multiplexer 5 are used as a pair; therefore, it is necessary to precisely match the device characteristics of the demultiplexer 4 and the multiplexer 5. In the event that two unmatched devices are combined the finished system will have higher loss. Additionally, when the channels are properly matched the entire channel width is available; however, in practice it is very difficult and labor intensive to manufacture such identically matched devices. Ensuring that the two devices are properly matched typically requires that they be selected very carefully, and their production yield has been typically very low.

Once two matched devices are used together it is important that their properties not change over time or atmospheric conditions. If two arrayed waveguide gratings (AWG) are used for demultiplexing and multiplexing the same set of wavelength channels then it is important that the two AWGs be at a same temperature because conventional AWGs suffer wavelength shifts with changing temperature. This requires that the two devices be heated or cooled very effectively, or that they be kept in close thermal contact to ensure that their temperatures are equal. Alternatively, they can be thermally compensated through a variety of techniques. Generally, thermally compensating an AWG increases the cost of the AWG and potential for device failure.

Figure 2A:
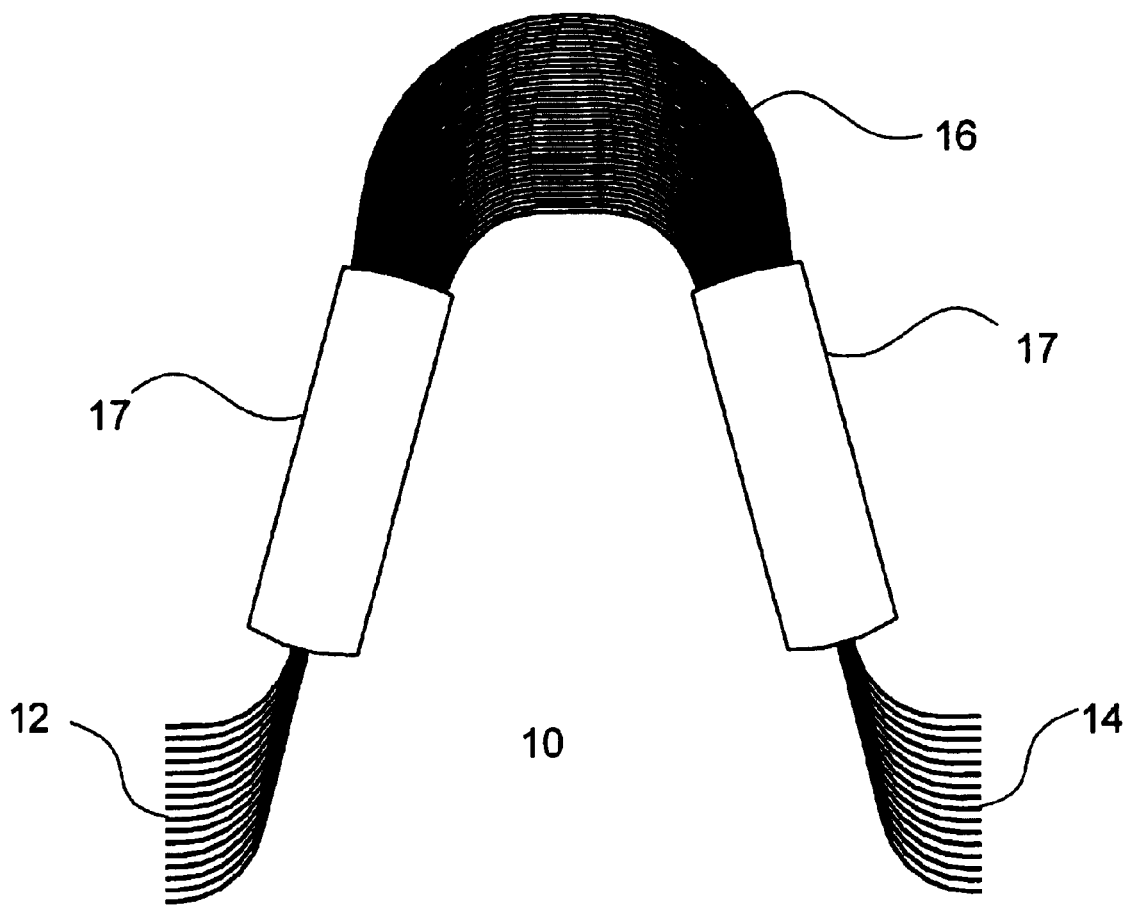
FIG. 2a is a schematic diagram of a prior art arrayed waveguide grating which can be use as a multiplexer or demultiplexer.

Referring to FIG. 2a, an arrayed waveguide grating device 10 according to the prior art is shown. It consists of input/output waveguide arrays 12, 14 and an arrayed waveguide grating 16. Slab waveguides 17 provide optical communication between the input/output waveguide array 12 and the arrayed waveguide grating 16, and between the input/output waveguide array 14 and the arrayed waveguide grating 16. In FIGS. 2b and 2c, an etched, reflective diffraction grating device 20 according to the prior art is shown. Device 20 includes an input/output waveguide 22, an input/output waveguide array comprising n individual input/output waveguides 23a to 23n, and an etched diffraction grating 26 disposed within an optical path between the waveguide 22 and the waveguide array 23.

Both prior art devices 10 and 20 are bi-directional, and thus either one of the devices 10 and 20 will work as both a wavelength multiplexer and as a wavelength demultiplexer. For example, when the prior art wavelength multi/demultiplexer device shown generally at 20 performs a demultiplexing function, a multiplexed optical signal is coupled from an optical fiber 28 through a port 21 to an input end of the input/output waveguide 22. At the distal end of the input/output waveguide 22, the light diverges into the slab waveguide and is dispersed in dependence upon wavelength by the etched diffraction grating 26, such that optical signals within individual wavelength channels are focused at a predetermined one of the inputs 30a to 30n of the plurality of input/output waveguides 23a to 23n. The individual wavelength channels are provided at ports 24a to 24n for subsequent processing. Conversely, when device 20 performs a multiplexing function, a plurality of signals, each within a separate wavelength channel, are launched into a predetermined one of the plurality of input/output waveguides 23a to 23n for providing the plurality of signals to the etched diffraction grating 26. The signals are multiplexed together, for instance each of the separate channelized signals are combined into a single optical signal, and the multiplexed signal is directed to the input/output waveguide 22, where it is coupled to the optical fiber 28 for transmission over the optical network.

The principles of operation of the two types of devices shown generally at 10 and 20 are similar in that they both contain a dispersive and focusing component, which are based upon an array of optical elements. Each of these elements introduces a slightly different optical path length for a beam traveling from an input port to an output port. In an etched grating, this optical element is a reflecting mirror, for instance a grating facet, whereas in the case of an AWG, it is an optical waveguide. Advantageously, the size of the etched grating device is much smaller than that of the phased waveguide array and the spectral finesse is much higher due to the fact that the number of teeth in the etched grating is much larger than the number of waveguides in the phased array. This allows the etched grating-based device to have a larger number of channels available over its free spectral range (FSR).

Figure 3:
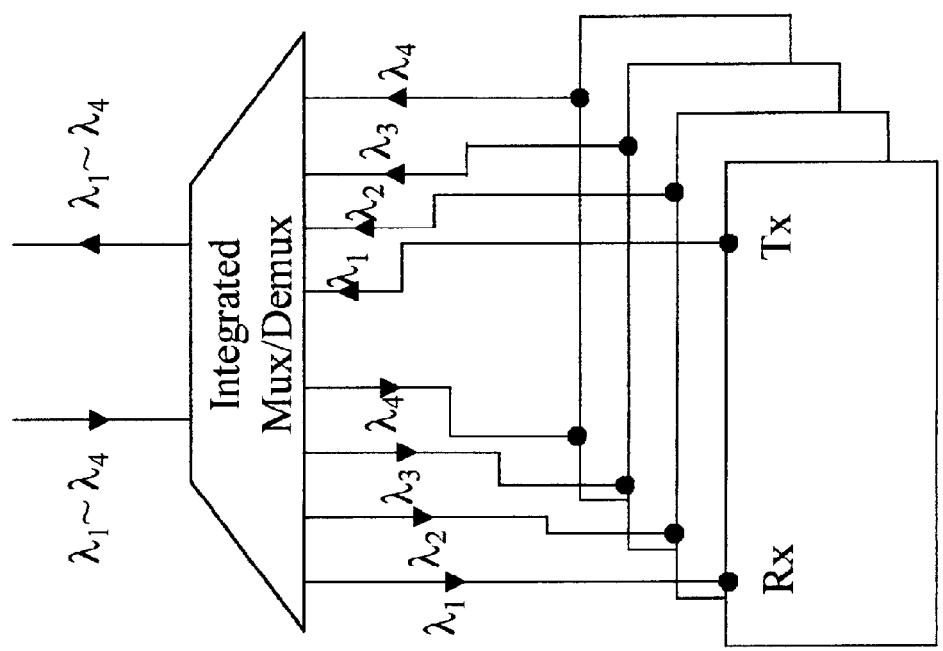
FIG. 3 is a schematic diagram of a transceiver module where the integrated dual-function multi/demultiplexer according to the present invention is used.

FIG. 3 shows a schematic diagram of a transceiver module where the integrated dual-function multi/demultiplexer according to the present invention is used. The multiplexer and demultiplexer are integrated on the same chip and packaged in the same module. This not only significantly reduces the cost, but also removes problems of channel wavelength mismatch related to conventional methods using separate mux/demux modules due to fabrication errors, time variations, and temperature instabilities.

Figure 4A:
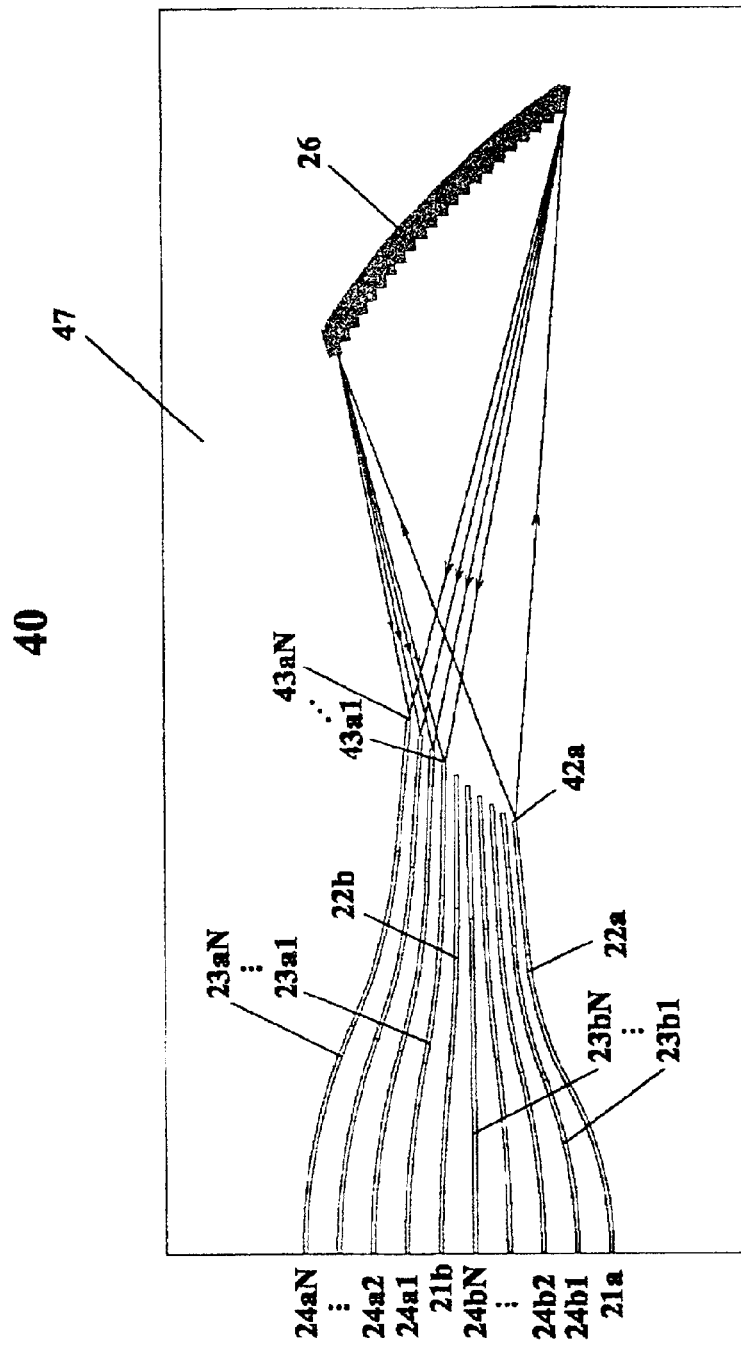
FIG. 4a is a schematic diagram of an integrated wavelength multi/demultiplexer device according to a first preferred embodiment of the present invention.
Figure 4B:
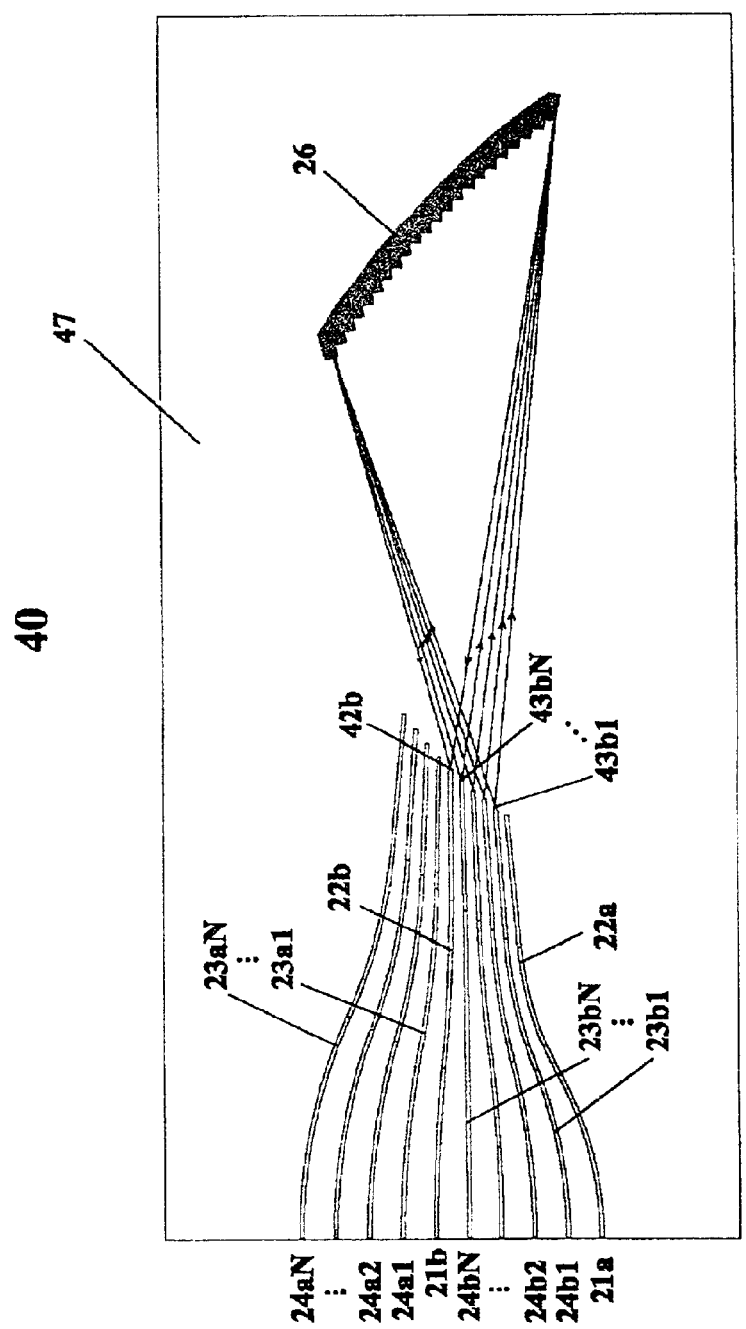
FIG. 4b is another schematic diagram of an integrated wavelength multi/demultiplexer device according to a first preferred embodiment of the present invention.

With reference to FIGS. 4a and 4b an integrated multi/demultiplexer device employing a same dispersive element for demultiplexing and multiplexing a plurality of different optical signals according to a first preferred embodiment of the current invention is shown generally at 40. The device comprises an input port 21a for coupling a first multiplexed optical signal containing a first plurality of wavelength channels from an optical fiber to an input waveguide 22a; a plurality of output ports 24a1 to 24aN, each for coupling a channelized signal of said first plurality of wavelength channels from a single corresponding waveguide 23a1 to 23aN to an optical fiber; a plurality of input ports 24b1 to 24bN, each for coupling a single wavelength signal of a second plurality of wavelength channels from an optical fiber to a single corresponding waveguide 23b1 to 23bN; an output port 21b for coupling a second multiplexed optical signal containing said second plurality of wavelength channels from an output waveguide 22b to an optical fiber; and an echelle grating element 26 disposed for separating the first multiplexed optical signal received from the input waveguide 22a into individual wavelength channels each coupled into a corresponding output waveguide 23a1 to 23aN and for combining the second plurality of wavelength channels received from the input waveguides 23b1 to 23bN into the second multiplexed optical signal coupled into the output waveguide 22b. As will be apparent to one of skill in the art, all of these components are optionally formed on a single substrate 47.

The demultiplexing operation of the device is shown in FIG. 4a. A first multiplexed optical signal propagating along channel waveguide 22a to a region defining a slab waveguide. The multiplexed signals fan out from the waveguide end point 42a into the slab waveguide region and propagate through said slab waveguide to a dispersive element 26. The grating 26 is positioned along the slab waveguide and is structured to intercept the first optical signal propagating within the slab waveguide and to diffract it into components of different wavelength angularly dispersed with respect to one another so that at a predetermined distance from the grating 26 said components of the first signal are spatially separated at locations 43a1 to 43aN corresponding to those of an input surface of one of a plurality of channel waveguides 23a1 to 23aN, each channel waveguide in optical communication with one port of the plurality of ports 24a1 to 24aN.

FIG. 4b shows the multiplexing operation of the device. The signals of a second plurality of wavelength channels each propagating along individual channel waveguides 24b1 to 24bN to the slab waveguide. The signals fan out from the waveguide endpoints 43b1 to 43bN into the slab waveguide and propagate through said slab waveguide to the grating 26. The grating 26 intercepts the optical signals of different wavelengths propagating within the slab waveguide and to combine them into a second multiplexed signal at a location corresponding to the input surface 42b of the channel waveguide 22b. The channel waveguide 22b guides the multiplexed signal to port 21b.

According to a preferred embodiment of the invention, the dispersive element 26 is a reflection type echelle grating formed with focusing as well as dispersion properties. Alternatively, other types of dispersive elements, for instance a transmissive arrayed waveguide grating, are functionally similar. However, the reflection-type echelle grating has advantages over arrayed waveguide gratings because it is smaller in size and the input and output ports of the dual-function device are optionally coupled to a single fiber array on one side of the chip, thus reducing the packaging costs.

Figure 5:
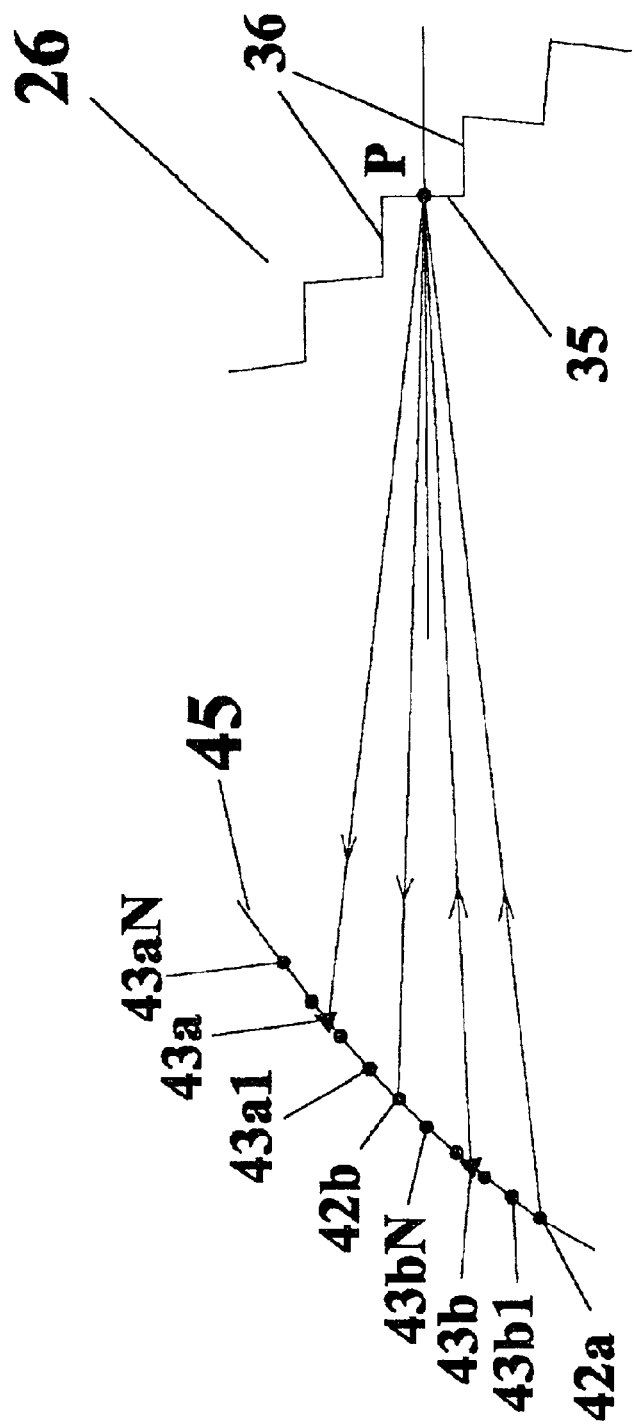
FIG. 5 is a schematic diagram showing the grating facet blazing angle design in relation to the channel waveguide endpoint arrangement according to the first preferred embodiment of the invention.

According to a preferred embodiment of the invention, the positions of the endpoints 42a, 43a 1 to 43aN, 42b, and 43b1 to 43bN of the input and output waveguides are arranged so that the reflecting facets of the echelle grating are optimally blazed simultaneously for both the demultiplexer and multiplexer, thus minimizing the insertion loss for both devices. FIG. 5 shows the schematic of the arrangement. For a grating facet 35 centered at point P, the normal to the facet divides substantially equally the angle formed by the waveguide endpoint 42a, point P and point 43a, which is the middle point between 43a1 and 43aN. At the same time, it also divides substantially equally the angle formed by the waveguide endpoint 42b, point P and point 43b, which is the middle point between 43b1 and 43bN.

According to a preferred embodiment of the invention that satisfies above criteria, the endpoints 42a 43a1 to 43aN, 42*b*, and 43*b*1 to 43*b*N of the input and output waveguides are located along a curved or straight line 45 in the order of 42*a*, 43*b*1 to 43*b*N, 42*b*, and 43*a*1 to 43*a*N. This allows the separation between any two adjacent end points to be substantially equal to the spatial dispersion generated by the grating for two wavelengths separated by a channel spacing in the wavelength domain. The total spreading of the endpoints along the line 45, and consequently the aberration effect of the grating are minimized. The device transmission loss caused by shadowing effect of side walls 36 is also minimized. To avoid waveguide crossings, the input and output ports are arranged in the same order, i.e., 21*a*, 24*b*1 to 24*b*N, 21*b*, and 24*a*1 to 24*a*N.

Very often, the requirements on certain specifications of the multiplexer and demultiplexer are different in a multi-wavelength transceiver. For example, the multiplexer generally has a less stringent requirement on crosstalk between adjacent channels and it is preferable to have a larger passband width. This can be realized by using a larger tapered waveguide width at the waveguide-slab interface for the multiplexer. It can also be realized by a slight defocusing in the positions of the waveguide ends corresponding to the multiplexer. Therefore, different performance specifications can be achieved for the multiplexer and demultiplexer even though the same dispersive element is used for both.

Figure 6:
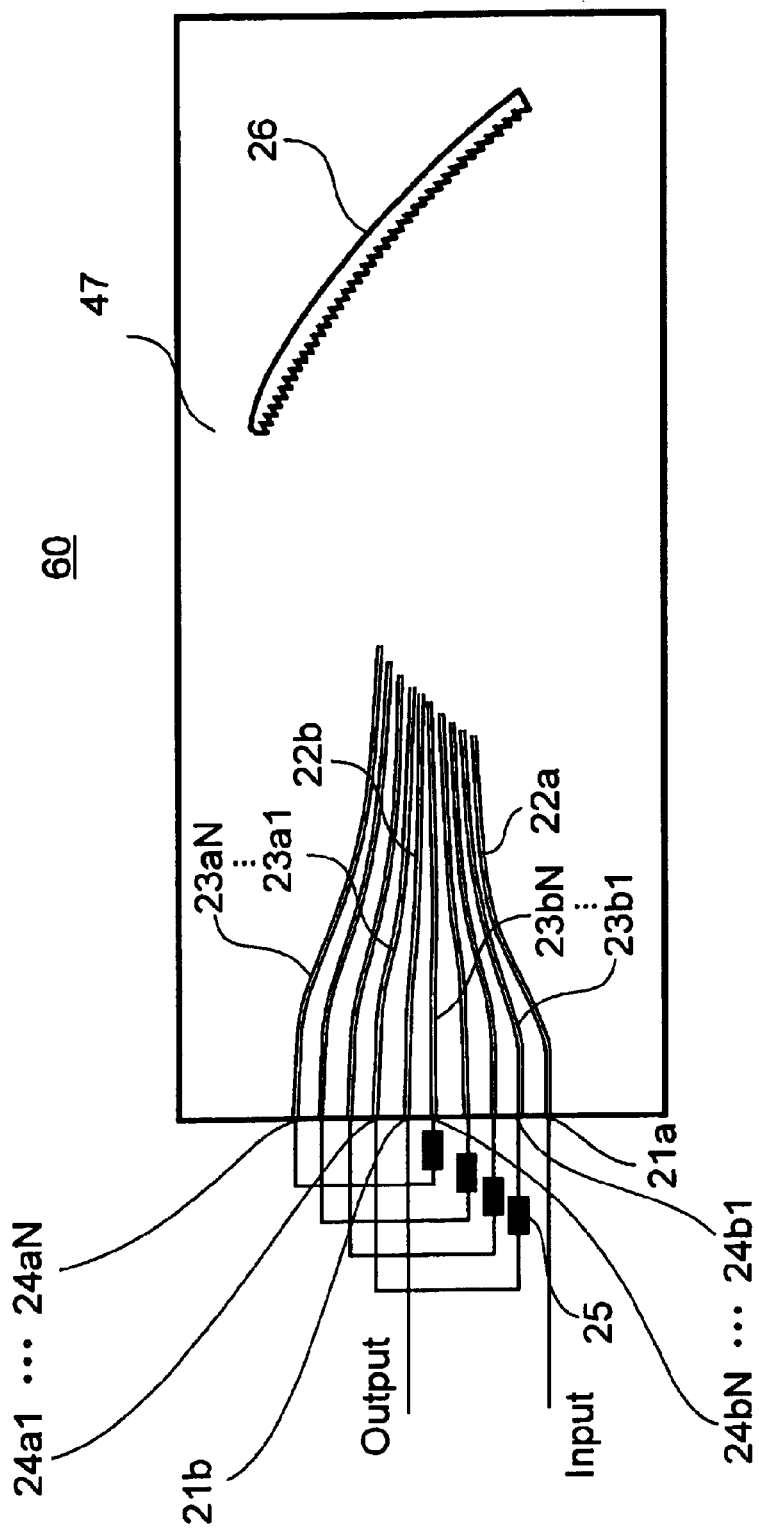
FIG. 6 is a schematic diagram of an integrated wavelength multi/demultiplexer device with connected ports according to a second preferred embodiment of the present invention.

With reference to FIG. 6 an integrated multi/demultiplexer device employing a same dispersive element for demultiplexing and multiplexing a plurality of different optical signals according to a second embodiment of the current invention is shown generally at 60.

The device comprises an input port 21*a* for coupling a first multiplexed optical signal containing a first plurality of wavelength channels from an optical fiber to an input waveguide 22*a*; a plurality of output ports 24*a*1 to 24*a*N, each for coupling a channelized signal of said first plurality of wavelength channels from a single corresponding waveguide 23*a*1 to 23*a*N to an optical fiber; a plurality of input ports 24*b*1 to 24*b*N, each for coupling a single wavelength signal of a second plurality of wavelength channels from an optical fiber to a single corresponding waveguide 23*b*1 to 23*b*N; an output port 21*b* for coupling a second multiplexed optical signal containing said second plurality of wavelength channels from an output waveguide 22*b* to an optical fiber; and an echelle grating element 26 disposed for separating the first multiplexed optical signal received from the input waveguide 22*a* into individual wavelength channels each coupled into a corresponding output waveguide 23*a*1 to 23*a*N and for combining the second plurality of wavelength channels received from the input waveguides 23*b*1 to 23*b*N into the second multiplexed optical signal coupled into the output waveguide 21*b*. As will be apparent to one of skill in the art, all of these components are optionally formed on a single substrate 47.

In the second embodiment of the invention a means for optically coupling each of the plurality of output ports 24*a*1 to 24*a*N to a corresponding port of the plurality of input ports 24*b*1 to 24*b*N is provided. Of course, it is possible to loop at least some of the channelized signals directly back to the dispersive element without modulating or otherwise processing the signal carried within the wavelength channel. Alternatively, at least some of the loop-back paths 25 are provided with an optical component, such as for instance a detector/source, an attenuator, a switch, etc., such that the channelised signal that is looped back is other than the same channelised signal originally received.

Figure 7:
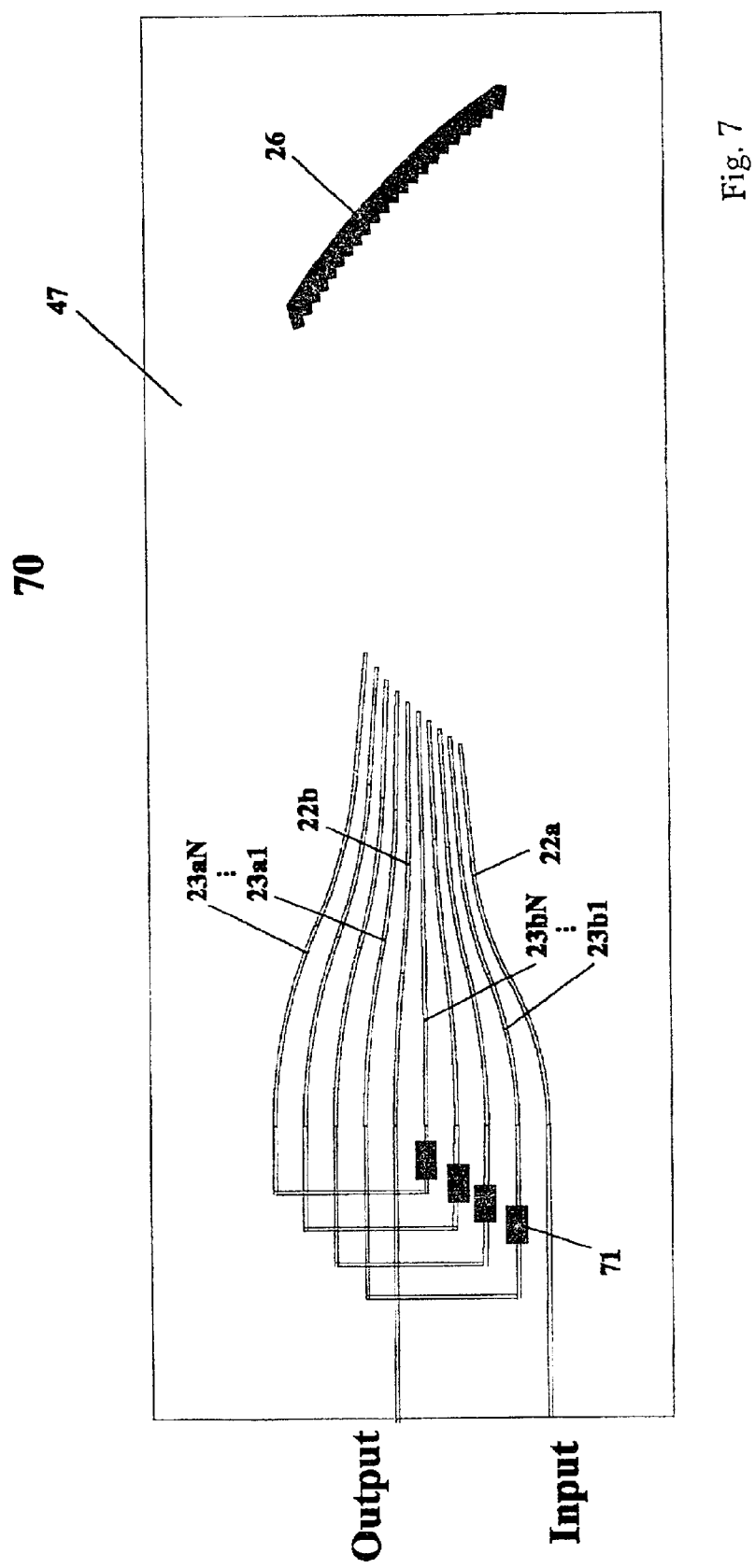
FIG. 7 is a schematic diagram of an integrated wavelength multi/demultiplexer device with integrated connected ports on a same substrate according to a third preferred embodiment the present invention.

With reference to FIG. 7, an integrated multi/demultiplexer device employing a same dispersive element for demultiplexing and multiplexing a plurality of different optical signals according to a third embodiment of the current invention is shown generally at 70. In the third embodiment a loop-back path including a further optical component 71 are integrally formed on the substrate.

It is an advantage of the embodiment that a plurality of wavelength channels are demultiplexed and multiplexed simultaneously using a same dispersive element. Thus the problems associated with mismatching performances of two optical devices are avoided. It is a further advantage of the first embodiment that the device is small compared to AWG based devices and that the input/output ports can be coupled to a single fiber array, thus reducing the packaging cost. The insertion loss of the device is minimized for both the demultiplexer and multiplexer for all channels, according to the preferred embodiment of the invention.

It is apparent to those skilled in the art that modifications and alternative embodiments can be made without departing substantially from the teachings of the invention. For example, from the first preferred embodiment of the invention, the direction of propagation of the signals can be reversed in one or both of the multiplexer and demultiplexer. The channel wavelengths of the multiplexer can be different than those of the demultiplexer.

What is claimed is:

1. An optical wavelength division multiplexer/demultiplexer device comprising:

a first input port for coupling a first multiplexed optical signal containing a first plurality of wavelength channels from an optical fiber to an input waveguide;

a plurality of first output ports associated with the first input port, each for coupling a channelized signal of said first plurality of wavelength channels from a single corresponding waveguide to an optical fiber;

a plurality of second input ports different from said first input port, each for coupling a channelized wavelength signal of a second plurality of wavelength channels from an optical fiber to a single corresponding waveguide, the plurality of input ports being other than the plurality of output ports;

a second output port associated with the plurality of second input ports, the second output port for coupling a second multiplexed optical signal containing said second plurality of wavelength channels from an output waveguide to an optical fiber, the second output port being other than the first input port; and, an echelle grating element disposed for separating the first multiplexed optical signal received from the input waveguide into signals within individual wavelength channels and for directing each into a corresponding output waveguide and combining a second plurality of signals within corresponding wavelength channels received from the input waveguides into a second multiplexed optical signal and for providing the second multiplexed optical signal to the output waveguide.

2. An optical wavelength division multiplexer/demultiplexer device according to claim 1 wherein each of the plurality of first output ports is for receiving light within predetermined channels and provided from the first input port and not for receiving light within the same predetermined channels from either of the second output port and the plurality of second input ports.

3. An optical wavelength division multiplexer/demultiplexer device according to claim 2 wherein the echelle grating and the input and output ports are disposed such that the wavelengths of said second plurality of wavelength channels are substantially the same as those of said first plurality of wavelength channels.

4. An optical wavelength division multiplexer/demultiplexer device according to claim 3 wherein each of the input and output ports are optically coupled with a waveguide having opposing ends, the positions of which are arranged so that reflective facets of the echelle grating are properly blazed for supporting a propagation of optical signals simultaneously traveling from the first input port to the plurality of first output ports and from the plurality of second input ports to the second output port.

5. An optical wavelength division multiplexer/demultiplexer device according to claim 4 wherein for a grating facet centered at a point P, a normal to the facet divides substantially equally an angle formed between the opposing endpoint of the waveguide optically coupled with the first input port, the point P, and a middle point between the opposing ends of the waveguides optically coupled with the plurality of first output ports, and said normal to the facet divides substantially equally an angle formed between the opposing endpoint of the waveguide optically coupled with the second output port, the point P, and a middle point between the opposing ends of the waveguides optically coupled with the plurality of second input ports.

6. An optical wavelength division multiplexer/demultiplexer device according to claim 5 wherein the opposing ends of the waveguides optically coupled with the plurality of second input ports are tapered differently than those of the waveguides optically coupled with the plurality of first output ports such that waveguide openings at the said waveguide ends have different widths.

7. An optical wavelength division multiplexer/demultiplexer device according to claim 5 wherein the opposing end of the waveguide optically coupled with the first input port are tapered differently than that of the waveguide optically coupled with the second output port such that waveguide openings at the said waveguide ends have different widths.

8. An optical wavelength division multiplexer/demultiplexer device according to claim 5 wherein the opposing ends of the waveguides optically coupled with at least one of the first input and second output ports are located at slightly defocused positions.

9. An optical wavelength division multiplexer/demultiplexer device according to claim 5 comprising a coupler for optically coupling each of the plurality of first output ports to a corresponding port of the plurality of second input ports.

10. An optical wavelength division multiplexer/demultiplexer device according to claim 9 wherein the coupler comprises at least an optical signal processing component disposed within the each optical path coupled between each of the plurality of first output ports and a corresponding port of the plurality of second input ports, the at least an optical signal processing component for affecting light signals during propagation between the plurality of first output ports and the plurality of second input ports.

11. An optical wavelength division multiplexer/demultiplexer device according to claim 10 wherein said optical signal processing component is an optical switch for performing an optical add-drop function.

12. An optical wavelength division multiplexer/demultiplexer device according to claim 10 wherein said optical signal processing component is a variable optical attenuator for performing a signal equalization function.

13. An optical wavelength division multiplexer/demultiplexer device according to claim 10 comprising a substrate having integrally formed therein the input and output ports, the echelle grating, and the optical signal processing components.

14. An optical wavelength division multiplexer/demultiplexer device according to claim 13 wherein the substrate is made of a material selected from the group consisting of: InP, GaAs, $SiO_2$ and Si.

15. An optical wavelength division multiplexer/demultiplexer device comprising:

an integrated substrate;

a first port for propagating a first signal having optical signals within at least two predetermined wavelength channels;

a plurality of third ports associated with the first port, each of which are for propagating an optical signal within one predetermined wavelength channel of the first signal;

a second port for propagating a second signal having optical signals within at least two predetermined wavelength channels;

a plurality of fourth ports associated with the second port, each of which are for propagating an optical signal within one predetermined wavelength channel of the second signal; and, a same echelle grating optically disposed within a first optical path between the first port and the plurality of third ports and within a second optical path between the second port and the plurality of fourth ports, the second optical path being other than the first optical path, wherein signals provided at each of the first and second ports propagate in a first direction along the first and the second optical path, respectively, to the same echelle grating, the echelle grating for independently dispersing the signals propagating along the first and the second optical path, respectively, in dependence upon wavelength to provide an optical signal within a separate predetermined wavelength channel to each port of the associated plurality of third ports and fourth ports, wherein at least two optical signals provided within separate predetermined wavelength channels at separate ports of the plurality of third ports propagate in a direction opposite the first direction along at least two associated first optical paths to the same echelle grating, the echelle grating for multiplexing the two optical signals and for providing a signal having optical signals within the at least two predetermined wavelength channels to the associated first port, and wherein at least two optical signals provided within the same separate predetermined wavelength channels at separate ports of the plurality of fourth ports propagate in a direction opposite the first direction along at least two associated second optical paths to the same echelle grating, the echelle grating for independently multiplexing the two optical signals and for providing a signal having optical signals within the two predetermined wavelength channels to the associated second port, and, wherein the first and second ports, the plurality of third and fourth ports and the same echelle grating are integrally formed within the integrated substrate, wherein the plurality of third ports comprises at least four ports and, the plurality of fourth ports comprises at least four ports.

16. An optical wavelength division multiplexer/demultiplexer device according to claim 15 wherein the plurality of third ports comprises at least four ports, each of the at least four ports for supporting an optical signal having a specific wavelength channel and, the plurality of fourth ports comprises at least four other ports, each of the at least four other ports for supporting an optical signal having a specific wavelength channel.

17. An optical wavelength division multiplexer/demultiplexer device according to claim 16 wherein, the set of wavelengths of the specific wavelength channels supported by the at least four ports is equivalent to the set of wavelengths of the specific wavelength channels supported by the at least four other ports.

18. An optical wavelength division multiplexer/demultiplexer device according to claim 15 wherein, the first port is optically isolated from the second port.

19. An optical wavelength division multiplexer/demultiplexer device according to claim 18 wherein, each of the plurality of third ports is optically isolated from each of the plurality of fourth ports.

20. An optical wavelength division multiplexer/demultiplexer device according to claim 17 comprising at least one region disposed between the first port and the plurality of third ports and between the second port and the plurality of fourth ports, said at least one region defining a slab waveguide along which, when in use, the first and second other signals propagate.

21. An optical wavelength division multiplexer/demultiplexer device according to claim 20 wherein the substrate is made of a material selected from the group consisting of: InP, GaAs, $SiO_2$ and Si.

22. An optical wavelength division multiplexer/demultiplexer device according to claim 20 wherein the echelle grating is positioned along the slab waveguide and is structured to intercept the first and second other signals propagating within the slab waveguide and to diffract said first and second other signals into component signals of different wavelength angularly dispersed with respect to one another so that at a predetermined distance from the echelle grating each component signal is approximately channelized, each channelized component signal of the first signal guided to one of the plurality of third ports associated with the first port and each channelized component signal of the second signal guided to one of the plurality of fourth ports associated with the second port.

23. An optical wavelength division multiplexer/demultiplexer device according to claim 22 wherein the at least two wavelength channels of the first signal are similar to the at least two wavelength channels of the second signal.

24. An optical wavelength division multiplexer/demultiplexer device according to claim 23 wherein a first direction of propagation of the first signal and a second direction of propagation of the second signal are approximately opposite directions of propagation.

25. An optical wavelength division multiplexer/demultiplexer device according to claim 23 wherein a first direction of propagation of the first signal and a second direction of propagation of the second signal are approximately parallel directions of propagation.

26. An optical wavelength division multiplexer/demultiplexer device according to claim 24 comprising a coupler for optically coupling each of the plurality of third ports to a corresponding port of the plurality of fourth ports.

27. An optical wavelength division multiplexer/demultiplexer device according to claim 26 comprising at least an optical component disposed within the coupler coupling each of the plurality of third ports to a corresponding port of the plurality of fourth ports, the optical component for affecting light signals during propagation between the third ports and the fourth ports.

28. An optical wavelength division multiplexer/demultiplexer device according to claim 17 wherein the echelle grating is a reflection type echelle grating having focusing properties.

29. An optical wavelength division multiplexer/demultiplexer device according to claim 28 wherein each of the first second third and fourth ports are each optically coupled with a waveguide and are arranged so that reflective facets of the echelle grating are blazed simultaneously for each said waveguide.

30. An optical wavelength division multiplexer/demultiplexer device according to claim 29 wherein for a grating facet centered at a point P, a normal to the facet divides substantially equally an angle formed between the opposing endpoint of the waveguide optically coupled with the first port, the point P, and a middle point between the opposing ends of the waveguides optically coupled with the plurality of third ports, and a normal to the facet divides substantially equally an angle formed between the opposing endpoint of the waveguide optically coupled with the second port, the point P, and a middle point between the opposing ends of the waveguides optically coupled with the plurality of fourth ports.

31. An optical wavelength division multiplexer/demultiplexer device comprising:

an integrated substrate;

a first port for receiving a first signal having optical signals within at least four different predetermined wavelength channels;

a second other port for outputting a second signal having optical signals within at least four different predetermined wavelength channels;

a plurality of third ports associated with the first port, each of the plurality of third ports for providing an optical signal within one different predetermined wavelength channel of the optical signal received at the first port;

a plurality of fourth ports associated with the second port, each of the plurality of fourth ports for providing an optical signal within one different predetermined wavelength channel of the optical signal output from the second port, the plurality of fourth ports being other than the plurality of third ports; and, a same dispersive element disposed within a first optical path for dispersing a light signal received from the first port in dependence upon wavelength to provide channelized optical signals to each of the third ports, and disposed within a second optical path for independently combining light signals received from the fourth ports of different predetermined wavelengths to provide a multiplexed optical signal to the second port, wherein the dispersive element operates independently as demultiplexer and multiplexer for optical signals traveling along the first and the second path, respectively, and, wherein the first and second ports, the plurality of third and fourth ports and the same dispersive element are integrally formed within the integrated substrate.

32. An optical wavelength division multiplexer/demultiplexer device according to claim 31 wherein the same dispersive element is an echelle grating.

33. An optical wavelength division multiplexer/demultiplexer device according to claim 32 wherein the echelle grating is a reflection type echelle grating having focusing properties.

34. An optical wavelength division multiplexer/demultiplexer device according to claim 33 wherein each of the first, second, third and fourth ports are each optically coupled with a waveguide and are arranged so that reflective facets of the echelle grating are blazed simultaneously for each said waveguide.

35. An optical wavelength division multiplexer/demultiplexer device according to claim 34 wherein for a grating facet centered at a point P, a normal to the facet divides substantially equally an angle formed between the opposing endpoint of the waveguide optically coupled with the first port, the point P, and a middle point between the opposing ends of the waveguides optically coupled with the plurality of third ports, and a normal to the facet divides substantially equally an angle formed between the opposing endpoint of the waveguide optically coupled with the second port, the point P, and a middle point between the opposing ends of the waveguides optically coupled with the plurality of fourth ports.

36. An optical wavelength division multiplexer/demultiplexer device according to claim 1 wherein,
the plurality of first output ports comprises at least four output ports, each of the at least four output ports for supporting an optical signal having a specific wavelength channel and,
the plurality of second input ports comprises at least four input ports, each of the at least four input ports for supporting an optical signal having a specific wavelength channel.

37. An optical wavelength division multiplexer/demultiplexer device according to claim wherein,
the set of wavelengths of the specific wavelength channels supported by the at least four output ports is equivalent to the set of wavelengths of the specific wavelength channels supported by the at least four input ports.

38. An optical wavelength division multiplexer/demultiplexer device according to claim 1 wherein, the first input port is optically isolated from the second output port.

39. An optical wavelength division multiplexer/demultiplexer device according to claim 38 wherein, each of the plurality of second input ports is optically isolated from each of the plurality of first output ports.

40. An optical wavelength division multiplexer/demultiplexer device according to claim 15 wherein each of the plurality of third ports is for receiving light within predetermined channels and provided from the first port and not for receiving light within the same predetermined channels from either of the second port and the plurality of fourth ports.

* * * * *